(12) United States Patent
Kuppan et al.

(10) Patent No.: US 11,673,674 B2
(45) Date of Patent: Jun. 13, 2023

(54) EVACUATION SLIDE HAVING DROP STITCH INFLATABLE STRUCTURE

(71) Applicant: Goodrich Corporation, Charlotte, NC (US)

(72) Inventors: Skandan Berikai Kuppan, Bangalore (IN); Jeffrey Martin Werbelow, Phoenix, AZ (US); Satya Swaroop Panda, Bangalore (IN); Rohan Rajiv Motewar, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 214 days.

(21) Appl. No.: 17/134,308

(22) Filed: Dec. 26, 2020

(65) Prior Publication Data

US 2022/0089290 A1 Mar. 24, 2022

(30) Foreign Application Priority Data

Sep. 18, 2020 (IN) .............................. 202041040542

(51) Int. Cl.
| | |
|---|---|
| *B64D 25/14* | (2006.01) |
| *B32B 7/09* | (2019.01) |
| *B32B 5/02* | (2006.01) |
| *B32B 27/12* | (2006.01) |
| *B32B 27/30* | (2006.01) |

(Continued)

(52) U.S. Cl.
CPC .............. *B64D 25/14* (2013.01); *B32B 5/024* (2013.01); *B32B 7/09* (2019.01); *B32B 27/12* (2013.01); *B32B 27/304* (2013.01); *D03D 1/02* (2013.01); *D03D 11/00* (2013.01); *D03D 15/283* (2021.01); *B32B 2262/0284* (2013.01); *B32B 2307/7242* (2013.01); *D10B 2331/04* (2013.01); *D10B 2505/12* (2013.01)

(58) Field of Classification Search
CPC ........... B64D 25/14; B32B 7/09; B32B 5/024; B32B 27/304; B32B 2307/7242; B32B 2262/0284; D03D 11/00; D03D 15/283; D03D 1/02; D10B 2331/04; D10B 2505/12

See application file for complete search history.

(56) References Cited

U.S. PATENT DOCUMENTS

| 3,726,375 A | 4/1973 | Blate et al. |
| 2019/0276156 A1 | 9/2019 | Boyer et al. |

(Continued)

FOREIGN PATENT DOCUMENTS

| AU | 2010100324 | * | 5/2010 |
| EP | 1410987 | | 4/2004 |

(Continued)

OTHER PUBLICATIONS

European Patent Office; Extended European Search Report dated Feb. 3, 2022 in Application No. 21197187.4.

*Primary Examiner* — Cephia D Toomer
(74) *Attorney, Agent, or Firm* — Snell & Wilmer L.L.P.

(57) ABSTRACT

An evacuation slide may comprise a first side rail, a second side rail, and a sliding structure. The first side rail and the second side rail may each extend from a head end of the evacuation slide to a toe end of the evacuation slide. The sliding structure may be located between the first side rail and the second side rail. The sliding structure may comprise a drop stitch fabric.

16 Claims, 4 Drawing Sheets

(51) Int. Cl.
  *D03D 11/00* (2006.01)
  *D03D 15/283* (2021.01)
  *D03D 1/02* (2006.01)

(56) References Cited

U.S. PATENT DOCUMENTS

2020/0062358 A1  2/2020  Boyer et al.
2020/0216154 A1  7/2020  Gordon et al.

FOREIGN PATENT DOCUMENTS

| EP | 3335994 | | 6/2018 |
|---|---|---|---|
| WO | WO 2009061246 | * | 5/2009 |
| WO | 20180206785 | | 11/2018 |
| WO | 2018078041 | | 9/2019 |

* cited by examiner

EVACUATION SLIDE HAVING DROP STITCH INFLATABLE STRUCTURE

CROSS-REFERENCE TO RELATED APPLICATIONS

This application claims priority to, and the benefit of, India Patent Application No. 202041040542, filed Sep. 18, 2020 and titled "EVACUATION SLIDE HAVING DROP STITCH INFLATABLE STRUCTURE," which is incorporated by reference herein in its entirety for all purposes.

FIELD

The present disclosure relates to aircraft evacuation systems and, in particular, to evacuation slides having a drop stitch inflatable structure.

BACKGROUND

Emergency evacuation systems may be used to exit an aircraft absent a jet way or other suitable means of egress for passengers. The evacuation systems generally include an inflatable slide that deploys from an aircraft fuselage or wing and a charge cylinder to inflate the slide. The slides may also include support tubes and straps located under the sliding surface to increase the structural strength of the slide and reduce buckling. The combination of the slide, its support structures, and the charge cylinder results in a larger pack volume. Decreasing the inflation volume of the slide and/or reducing the number of support structures can lead to smaller charge cylinders and may decrease the overall pack size of the evacuation system.

SUMMARY

An evacuation slide is disclosed herein. In accordance with various embodiments, the evacuation slide may comprise a first side rail, a second rail, and a sliding structure. The first side rail and the second side rail may each extend from a head end of the evacuation slide to a toe end of the evacuation slide. The sliding structure may be located between the first side rail and the second side rail. The sliding structure may comprise a first drop stitch fabric.

In various embodiments, the first drop stitch fabric may comprise a first layer, a second layer, and a plurality of drop stitch yarns extending between the first layer and the second layer. The first layer may form a sliding surface of the evacuation slide. In various embodiments, the first layer may comprise a first fabric layer and a first skin attached to the first fabric layer. The second layer may comprise a second fabric layer and a second skin attached to the second fabric layer. The first skin and the second skin may each comprise a gas impermeable material.

In various embodiments, the first skin may be bonded to the second skin to form airtight seal about a perimeter of the sliding structure. In various embodiments, an end cap may be bonded to the first skin and the second skin.

In various embodiments, the first side rail may comprise a second drop stitch fabric and the second side rail may comprise a third drop stitch fabric. In various embodiments, a head rail may be fluidly coupled to at least one of the first side rail or the second side rail. A diameter of the head rail may be greater than a diameter of the at least one of the first side rail or the second side rail. In various embodiments, the sliding structure may be fluidly coupled to at least one of the first side rail or the second side rail.

An evacuation system is also disclosed herein. In accordance with various embodiments, the evacuation system may comprise an evacuation slide, including a sliding structure, and a compressed fluid source fluidly coupled to the sliding structure. The sliding structure may comprise a first drop stitch fabric.

In various embodiments, the first drop stitch fabric may comprise a first layer, a second layer, and a plurality of first drop stitch yarns extending between the first layer and the second layer. The first layer may form a sliding surface of the evacuation slide. In various embodiments, the plurality of first drop stitch yarns may be at least one of perpendicular or almost perpendicular to the sliding surface.

In various embodiments, the evacuation slide may further include a side rail extending from a head end of the evacuation slide to a toe end of the evacuation slide. The side rail may comprise a second drop stitch fabric. In various embodiments, the second drop stitch fabric may comprise an inner layer, an outer layer, and a plurality of second drop stitch yarns extending between the inner layer and the outer layer. The plurality of second drop stitch yarns may be at least one of parallel or almost parallel to the sliding surface.

In various embodiments, an end cap may be bonded to the inner layer and the outer layer of the second drop stitch fabric. In various embodiments, the first drop stitch fabric may define a first chamber and the second drop stitch fabric may define a second chamber. The first chamber may be fluidly coupled to the second chamber.

An inflatable structure for an evacuation slide is also disclosed herein. In accordance with various embodiments, the inflatable structure may comprise a first layer forming a first surface of the inflatable structure, a second layer forming a second surface of the inflatable structure opposite the first surface, and a plurality of drop stitch yarns extending between the first layer and the second layer.

In various embodiments, the first layer may include a first fabric layer and a first skin attached to the first fabric layer. The first skin may form a least a portion of the first surface of the inflatable structure. The second layer may include a second fabric layer and a second skin attached to the second fabric layer. The second skin may form at least a portion of the second surface.

In various embodiments, the first skin may be bonded to the second skin. In various embodiments, an end cap may be bonded to the first skin and the second skin. In various embodiments, the inflatable structure may be configured to form at least one of a side rail for the evacuation slide or a sliding structure for the evacuation slide.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. As used herein, "proximate" refers to a direction towards or a location closer to a reference component.

Evacuation systems of the present disclosure include inflatable slides having one or more inflatable structure(s) comprised of drop stitch fabric. The drop stitch fabric includes a coated fabric material having spacer threads (i.e., a drop stitch yarns as described herein) extending between opposing faces of the fabric. The opposing faces of the fabric form an inflatable chamber. Upon inflation, the shape of the chamber is maintained by the spacer threads, allowing the inflated structure to maintain its shape and stability. In this regard, the inflated drop stitch structure(s) may increase the loads associated with a buckling (i.e., bending) of the slide. The rigidity of the drop stitch structure(s) may allow for a reduction in the number, or an elimination, of transverse support tubes and/or for the diameter of the side rails of the evacuation slide to be decreased. Fewer transverse support tubes and smaller side rails are associated with the use of less slide material and a decreased inflatable volume. The decreased inflatable volume may allow for smaller charge cylinders and/or may eliminate a need for air aspiration during inflation. Decreasing the amount of slide material and charge cylinder size and/or eliminating, or reducing a number of, aspirators tends to decrease an overall pack size of the evacuation system.

Figure 1:
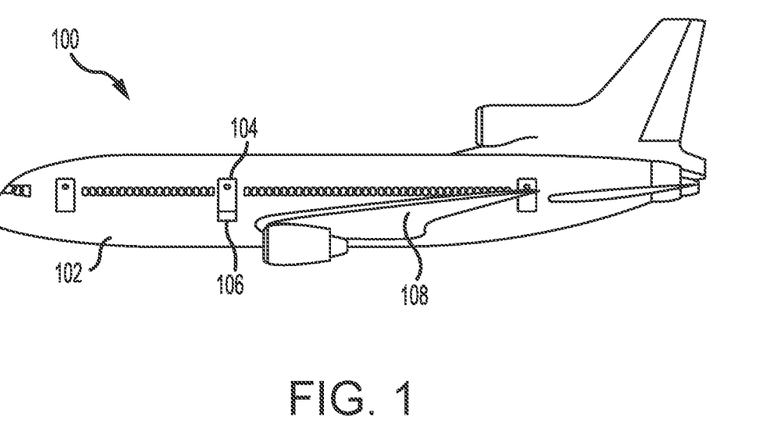
FIG. 1 illustrates an aircraft having an evacuation system, in accordance with various embodiments.

Referring now to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. In various embodiments, evacuation system 106 may deploy in response to exit door 104 being opened or in response to another action taken by a passenger or crew member such as, for example, depression of a button, actuation of a lever, or the like. While evacuation system 106 is disclosed as deploying from exit door 104, it is further contemplated and understood that evacuation system 106 may deploy from other locations. For example, evacuation system 106 may deploy from over a wing 108 of aircraft 100.

Figure 2A:
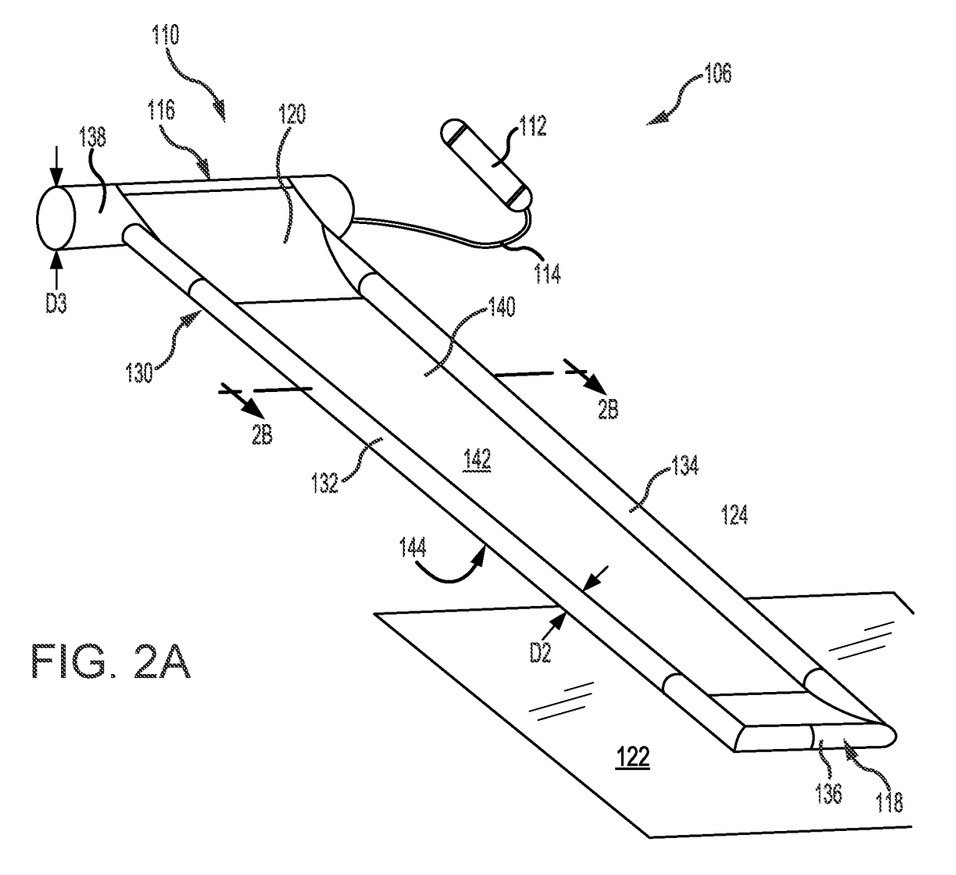
FIG. 2A illustrates a perspective view of an inflatable slide in a deployed position and having a drop stitch sliding structure, in accordance with various embodiments.

With reference to FIG. 2A, evacuation system 106 is illustrated in a deployed state, in accordance with various embodiments. Evacuation system 106 includes an evacuation slide 110. Evacuation slide 110 may be deployed from an aircraft, such as aircraft 100 in FIG. 1. Evacuation system 106 may further include a compressed fluid source 112 (also referred to as a charge cylinder). Compressed fluid source 112 is fluidly coupled to evacuation slide 110 via a conduit 114. Compressed fluid source 112 is configured to provide a pressurized gas to inflate evacuation slide 110.

Evacuation slide 110 includes a head end 116 and a toe end 118. Toe end 118 is opposite head end 116. Head end 116 may be coupled to an aircraft structure (e.g., a door sill) via a girt 120. Upon deployment of evacuation slide 110, toe end 118 translates away from the aircraft and contacts an exit surface 122. Exit surface 122 may comprise a ground surface or water, in the case of a water landing.

Evacuation slide 110 includes an inflatable rail structure 130. Inflatable rail structure 130 includes a first side rail 132, a second side rail 134, a toe rail 136, and a head rail 138. First and second side rails 132, 134 extend longitudinally between head rail 138 and toe rail 136. Toe rail 136 extends laterally between first side rail 132 and second side rail 134. In various embodiments, girt 120 may couple head rail 138 to the door sill of the aircraft from which evacuation slide 110 deploys. Head rail 138 may be configured to contact the outside surface of the aircraft fuselage, upon deployment.

In various embodiments, first side rail 132 is in fluid communication with second side rail 134, toe rail 136, and/or head rail 138. Stated differently, first side rail 132, second side rail 134, toe rail 136, and head rail 138 may be fluidly coupled to one another. In this regard, first side rail 132, second side rail 134, toe rail 136, and head rail 138 may be part of one, interconnected volume that fills with gas upon deployment of evacuation slide 110.

Evacuation slide 110 further includes a sliding structure 140. Sliding structure 140 forms a sliding surface 142 of evacuation slide 110. The sliding surface 142 (and sliding structure 140) extends from head rail 138 to toe rail 136 and from first side rail 132 to second side rail 134. Sliding structure 140 further includes an underside surface 144 oriented away from sliding surface 142. In accordance with various embodiments, sliding structure 140 is formed of drop stitch fabric. Stated differently, drop stitch fabric forms sliding surface 142 and underside surface 144 of sliding structure 140. While evacuation slide 110 is illustrated as a single lane slide, it is contemplated and understood that evacuation slide 110 may comprise any number of lanes.

Figure 2B:
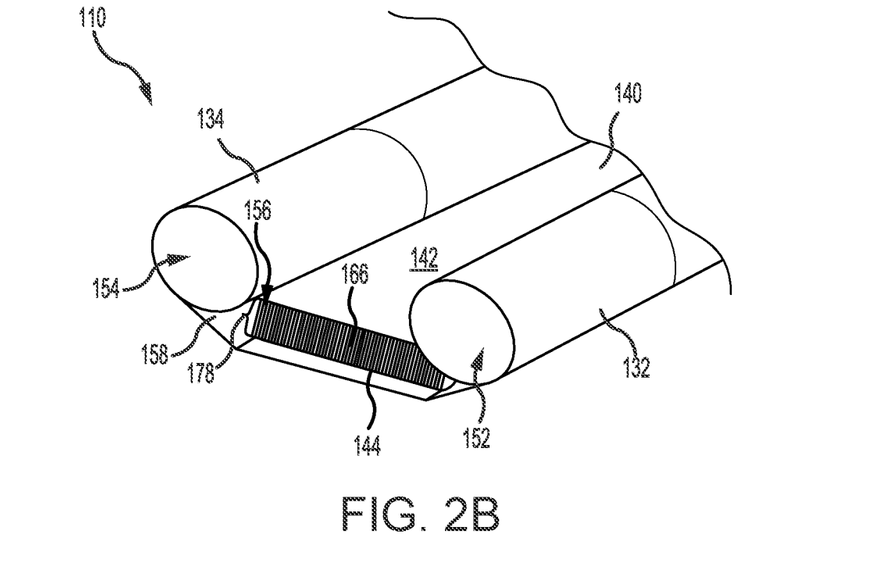
FIG. 2B illustrates a cross-section view of the evacuation slide of FIG. 2A taken along the line 2B-2B in FIG. 2A, in accordance with various embodiments.

With reference to FIG. 2B, a cross-section view of evacuation slide 110 is illustrated. In accordance with various embodiments, first side rail 132 defines an inflatable chamber 152, second side rail 134 defines an inflatable chamber 154, and sliding structure 140 defines an inflatable chamber 156. Inflatable chambers 152, 154 may each have a generally cylindrical shape and/or generally circular cross-section. Inflatable chamber 156 has a generally rectangular shape and/or generally rectangular cross-section. In the inflated state, sliding surface 142 may be parallel, or almost parallel, to underside surface 144. As used in the previous context only "almost parallel" means±10° from parallel. In various embodiments, a chine fabric 158 may be located over underside surface 144 (i.e., opposite sliding surface 142) and may extend between and/or be coupled to first side rail 132 and second side rail 134.

Figure 2C:
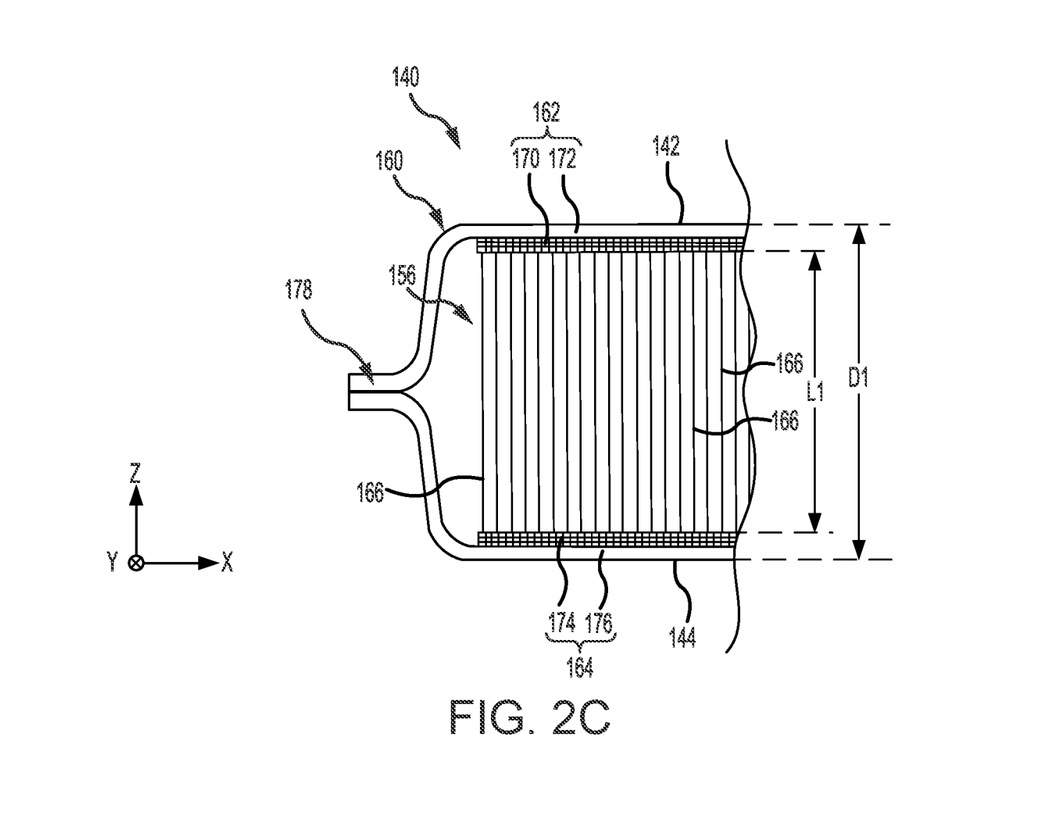
FIG. 2C illustrates a portion of the drop stitch sliding structure located of FIG. 2B, in accordance with various embodiments.

With reference to FIG. 2C, addition details of sliding structure 140 are illustrated. In accordance with various embodiments, sliding structure 140 comprises drop stitch fabric 160. Drop stitch fabric 160 is a 3D woven fabric having a first (or upper) layer 162, a second (or lower) layer 164, and drop stitch yarns 166 extending between first layer 162 and second layer 164. Each of first layer 162 and second layer 164 may include a fabric layer and a gas impermeable skin attached to the fabric layer. In accordance with various embodiments, first layer 162 includes first fabric layer 170 and first skin 172. Second layer 164 includes second fabric layer 174 and second skin 176. First fabric layer 170 and second fabric layer 174 may each be a woven layer. For example, first fabric layer 170 and second fabric layer 174 may each be woven using yarn woven in two orthogonal yarn directions (i.e., the warp direction and the weft direction). Drop stitch yarns 166 extend, and/or are woven, between first fabric layer 170 and second fabric layer 174 and are orthogonal to first fabric layer 170 and second fabric layer 174. In this regard, in the inflated state, the yarns of first and second fabric layers 170, 174 extend in a direction parallel to the X-axis and a direction parallel the Y-axis (on the provided XYZ axis), and the drop stitch yarns 166 extend in a direction parallel to the Z-axis. First fabric layer 170, second fabric layer, and drop stitch yarns 166 may comprise one or more of silk, nylon, aramid fiber (e.g., KEVLAR®), polyethylene terephthalate, or any other suitable weaving material. In various embodiments, first fabric layer 170, second fabric layer, and drop stitch yarns 166 comprise polyester. In various embodiments, first fabric layer 170, second fabric layer, and drop stitch yarns 166 are formed of the same material (e.g., polyester). In various embodiments, drop stitch yarns 166 are formed using a material different from first and second fabric layers 170, 174.

First and second skins 172, 176 comprise a gas impermeable material. For example, in order to maintain an airtight membrane, the first layer 162 and second layer 164 are made impermeable to gas by laminating a gas impermeable material to first and second fabric layers 170, 174. The gas impermeable material of first and second skins 172, 176 may comprise polyvinyl chloride, an elastomeric material, such as rubber or urethane, or any other material suitable for forming an airtight membrane. First skin 172 may form sliding surface 142. Second skin 176 may form underside surface 144. First and second fabric layers 170, 174 may form, at least a portion of, the interior surfaces of sliding structure 140, and first and second skins 172, 176 may form the exterior surfaces of sliding structure 140. In various embodiments, first skin 172 and second skin 176 form an airtight seal 178 around the perimeter of sliding structure 140. For example, first skin 172 may be heat bonded to second skin 176. In various embodiments, an adhesive may be employed to bond first skin 172 to second skin 176 and form airtight seal 178.

During inflation of sliding structure 140, fluid (e.g., gas) enters chamber 156, thereby increasing pressure within chamber 156 and forcing first layer 162 and second layer 164 apart. In the inflated stated, first layer 162 is spaced apart from second layer 164 by a distance D1. Distance D1 is governed by the length L of drop stitch yarns 166. In various embodiments, drop stitch yarns 166 may have a length L between 0.5 inches and 12.0 inches, between 0.75 inches and 5.0 inches, or of about 1.0 inches, about 2.0 inches, or about 2.5 inches (i.e., between 1.27 centimeters (cm) and 30.48 cm, between 1.91 cm and 12.70 cm, or of about 2.54 cm, about 5.08 cm, or about 6.35 cm). As used in the previous context only, the term "about" means±0.25 inches (i.e., ±0.632 cm). In the inflated stated, first fabric layer 170 may be parallel, or almost parallel, to second fabric layer 174. As used in the previous context only, "almost parallel" means±10° from parallel. In the inflated state, first and second layers 162, 164 become biaxially pretensioned, and the drop stitch yarns 166 extend to their tensioned length L to maintain shape of sliding structure 140. Tensioned drop stitch yarns 166 generate a stiffness in sliding structure 140 that resists axial, bending, shear, and torsion loads.

With combined reference to FIGS. 2A, 2B, and 2C, sliding structure 140 is fluidly coupled to compressed fluid source 112. In various embodiments, sliding structure 140 is fluidly coupled to at least one of first side rail 132, second side rail 134, toe rail 136, and/or head rail 138. In various embodiments, chamber 156 of sliding structure 140 may be fluidly sealed from first side rail 132, second side rail 134, toe rail 136, and head rail 138, and may receive fluid, during inflation, via its own dedicated conduit and/or its own dedicated compressed fluid source.

Drop stitch fabric 160 is configured such that, in the inflated state, drop stitch yarns 166 are oriented perpendicular, or almost perpendicular (i.e., between 80° and 100°), to the sliding surface 142 and to a sliding direction extending from head end 116 to toe end 118. The rigidity of inflated sliding structure 140 may resist bending loads. In this regard, evacuation slide 110 having a sliding structure 140 comprised of drop stitch fabric 160 may allow evacuation slide 110 to be formed without any transverse rails or with a reduced number of transverse rails (i.e., without inflatable tubes located under the sliding surface and/or extending laterally between first side rail 132 and second side rail 134). Further, the rigidity provided by drop stitch sliding structure 140 may allow a diameter D2 of first and second side rails 132, 134 to be decreased. For example, the first and second side rails of current evacuation slides, which do not include a drop stitch sliding structure, may be formed having a diameter of 17 inches (43.18 cm) to withstand buckling. Forming the same length and width slide surface using drop stitch sliding structure 140 may allow for first and second side rails 132, 134 to have a diameter D2 of between 4.0 inches and 10 inches, between 5.0 inches and 7.5 inches, or of about 5.0 inches (i.e., between 10.16 cm and 25.4 cm, between 12.7 cm and 19.05 cm, or of about 12.7 cm). As used in the previous context only, the term "about" means±0.5 inches (i.e., ±1.27 cm). In various embodiments, a diameter D3 of head rail 138 may be larger than the diameter D2 of first and second side rails 132, 134. The diameter D3 of head rail 138 may be selected such that head rail 138 contacts the aircraft fuselage to maintain sliding surface 142 at a safe sliding angle. In various embodiments, diameter D3 may be between 15 inches and 25 inches, between 17 inches and 20 inches, or about 17 inches (i.e., between 38.1 cm and 63.5 cm, between 43.18 cm and 50.38 cm, or about 43.18 cm). As used in the previous context only, the term "about" means±0.5 inches (i.e., ±1.27 cm). In various embodiments, the diameter D2 of first and second side rails 132, 134 may be between about 15% and about 75%, about 20% and about 50%, or about 30% of the diameter D3 of head rail 138. As used in the previous context only, the term "about" means±2%.

The reduced diameter of first and second side rails 132, 134 may decrease inflatable volume of evacuation slide 110. For example, the inflatable volume of evacuation slide 110 including drop stitch sliding structure 140 may be at least 20% less than the inflatable volume of a similar length and width slide without a drop stitch sliding structure. Reducing the inflatable volume may allow for a smaller compressed fluid source 112, may decrease inflation time, and/or may reduce the overall pack size of evacuation system 106.

Figure 3A:
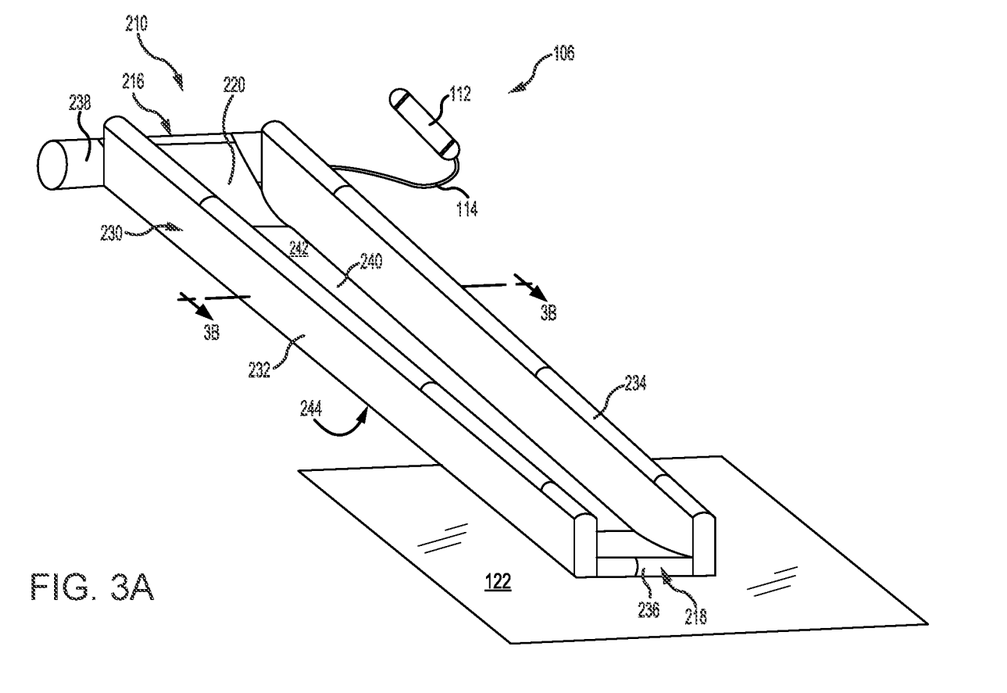
FIG. 3A illustrates a perspective view of an inflatable slide in a deployed position and having drop stitch side rails and a drop stitch sliding structure, in accordance with various embodiments.

With reference to FIG. 3A, an evacuation slide 210 is illustrated in an inflated, deployed state. In various embodiments, evacuation system 106 may include evacuation slide 210 in place of evacuation slide 110. Evacuation slide 210 may be inflated by compressed fluid source 112 of evacuation system 106.

Evacuation slide 210 includes a head end 216 and a toe end 218. Toe end 218 is opposite head end 216. Head end 216 may be coupled to an aircraft structure (e.g., a door sill) via a girt 220. Upon deployment of evacuation slide 210, toe end 218 translates away from the aircraft and contacts exit surface 122.

Evacuation slide 210 includes an inflatable rail structure 230. Inflatable rail structure 230 includes a first side rail 232, a second side rail 234, a toe rail 236, and a head rail 238. First and second side rails 232, 234 extend longitudinally between head rail 238 and toe rail 236. Toe rail 236 extends laterally between first side rail 232 and second side rail 234. In various embodiments, girt 220 may couple head rail 238 to the door sill of the aircraft from which evacuation slide 210 deploys.

In various embodiments, first side rail 232 is in fluid communication with second side rail 234, toe rail 236, and/or head rail 238. Evacuation slide 210 further includes a sliding structure 240. Sliding structure 240 forms a sliding surface 242 of evacuation slide 210. The sliding surface 242 (and sliding structure 240) extends from head rail 238 to toe rail 236, and from first side rail 232 to second side rail 234. Sliding structure 240 further includes an underside surface 244 oriented away from sliding surface 242. In accordance with various embodiments, sliding structure 240 is formed of drop stitch fabric, similar to sliding structure 140 of evacuation slide 110 in FIGS. 2A, 2B, and 2C. While evacuation slide 210 is illustrated as a single lane slide, it is contemplated and understood that evacuation slide 210 may comprise any number of lanes.

Figure 3B:
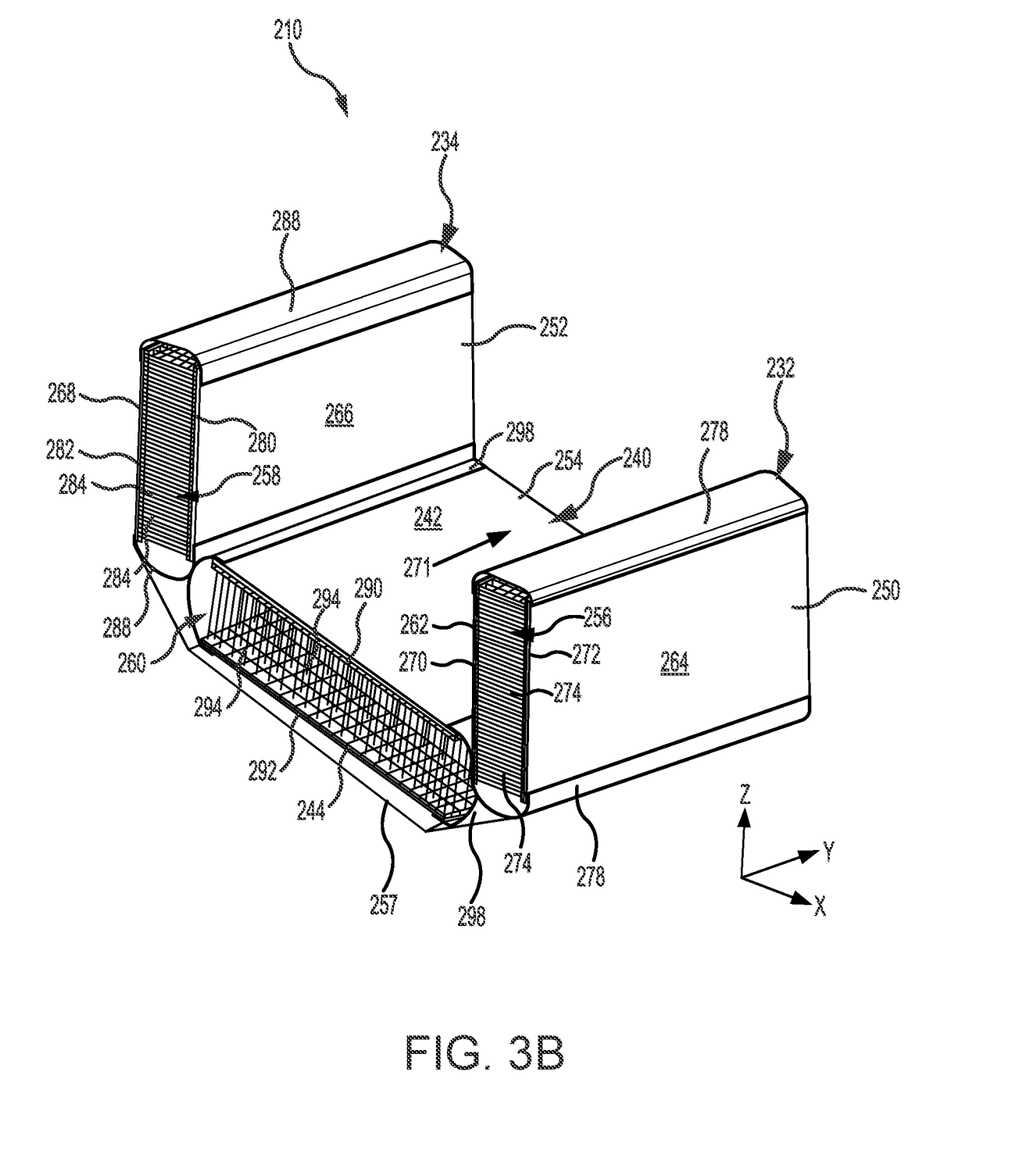
FIG. 3B illustrates a cross-section view of the evacuation slide of FIG. 3A taken along the line 3B-3B in FIG. 3A, in accordance with various embodiments.

With reference to FIG. 3B, a cross-section view of evacuation slide 210 is illustrated. In accordance with various embodiments, first side rail 232 comprises drop stitch fabric 250, second side rail comprises drop stitch fabric 252, and sliding structure 240 comprises drop stitch fabric 254. Drop stitch fabric 250 defines an inflatable chamber 256, drop stitch fabric 252 defines an inflatable chamber 258, and drop stitch fabric 254 defines an inflatable chamber 260. Inflatable chambers 256, 258, 260 may each have a generally rectangular shape and/or generally rectangular or oval cross-section. In this regard, an inner (or first) surface 262 of first side rail 232 may be parallel, or almost parallel, an outer (or second) surface 264 of first side rail 232. An inner (or first) surface 266 of second side rail 234 may be parallel, or almost parallel, to an outer (or second) surface 268 of second side rail 234. Sliding surface 242 may be parallel, or almost parallel, to underside surface 244 of sliding structure 240. As used in the previous context only, "almost parallel" means±10° from parallel. Inner surface 262 is oriented away from outer surface 264 and toward inner surface 266. Inner surface 266 is oriented away from outer surface 268 and toward inner surface 262. Sliding surface 242 is perpendicular, or almost perpendicular, to inner surfaces 262, 266. As used in the previous context only, "almost perpendicular" means±10° from perpendicular. In various embodiments, a chine fabric 257 may be located over underside surface 244 (i.e., opposite sliding surface 242) and may extend between and/or be coupled to first side rail 232 and second side rail 234.

In accordance with various embodiments, first side rail 232 comprises drop stitch fabric 250. Drop stitch fabric 250 is a 3D woven fabric having a first (or inner) layer 270, a second (or outer) layer 272, and drop stitch yarns 274 extending between first layer 270 and second layer 272. Each of first layer 270 and second layer 272 includes a fabric layer and a gas impermeable skin attached to the fabric layer, similar to drop stitch fabric 160 in FIG. 2C. The gas impermeable skin of first layer 270 forms, at least a portion of, inner surface 262 of first side rail 232. The gas impermeable skin of second layer 272 forms, at least a portion of, outer surface 264 of first side rail 232. Drop stitch yarns 274 extend, and/or are woven, between the fabric layer of first layer 270 and the fabric layer of second layer 272 of drop stitch fabric 250. In the inflated state, the yarns of the fabric layers of first and second layers 270, 272 extend in a direction parallel to the Z-axis and a direction parallel the Y-axis (on the provided XYZ axis), and the drop stitch yarns 274 extend in a direction parallel to the X-axis.

In various embodiments, first side rail 232 incudes end caps 278 coupled to the gas impermeable skins of first layer 270 and second layer 272. End caps 278 are comprised of a gas impermeable material. End caps 278 may be heat bonded to the gas impermeable skins of first layer 270 and second layer 272 to form an airtight seal between the end caps 278 and the drop stitch fabric 250. In various embodiments, an adhesive may bond end caps 278 to the gas impermeable skins of first layer 270 and second layer 272 to form an airtight seal between the end caps 278 and the drop stitch fabric 250.

During inflation of first side rail 232, fluid (e.g., gas) enters chamber 256, thereby increasing pressure within chamber 256 and forcing first layer 270 and second layer 272 apart. In the inflated stated, first layer 270 is spaced apart from second layer 272 by a distance governed by the length of drop stitch yarns 274. In the inflated state, first and second layers 270, 272 become biaxially pretensioned, and the drop stitch yarns 274 extend to their tensioned length to maintain the shape of first side rail 232. Tensioned drop stitch yarns 274 generate a stiffness in first side rail 232 that resists axial, bending, shear, and torsion loads. In accordance with various embodiments, drop stitch yarns 274 may be parallel, or almost parallel, to sliding surface 242, perpendicular, or almost perpendicular, to a sliding direction 271 extending from head end 216 (FIG. 3A) to toe end 218 (FIG. 3A), and perpendicular, or almost perpendicular, to inner and outer surfaces 262, 264. As used in the previous context only, "almost parallel" means±10° from parallel and "almost perpendicular" means±10° from perpendicular.

In accordance with various embodiments, second side rail 234 comprises drop stitch fabric 252. Drop stitch fabric 252 is a 3D woven fabric having a first (or inner) layer 280, a second (or outer) layer 282, and drop stitch yarns 284 extending between first layer 280 and second layer 282. Each of first layer 280 and second layer 282 includes a fabric layer and a gas impermeable skin attached to the fabric layer, similar to drop stitch fabric 160 in FIG. 2C. The gas impermeable skin of first layer 280 forms, at least a portion of, inner surface 266 of second side rail 234. The gas impermeable skin of second layer 282 forms, at least a portion of, outer surface 268 of second side rail 234. Drop stitch yarns 284 extend, and/or are woven, between the fabric layer of first layer 280 and the fabric layer of second layer 282 of drop stitch fabric 252. In the inflated state, the yarns of the fabric layers of first and second layers 280, 282 extend in a direction parallel to the Z-axis and a direction parallel the Y-axis (on the provided XYZ axis), and the drop stitch yarns 284 extend in a direction parallel to the X-axis.

In various embodiments, second side rail 234 incudes end caps 288 coupled to the gas impermeable skins of first layer 280 and second layer 282. End caps 288 are comprised of a gas impermeable material. End caps 288 may be heat bonded to the gas impermeable skins of first layer 280 and second layer 282 to form an airtight seal between the end caps 288 and the drop stitch fabric 252. In various embodiments, an adhesive may bond end caps 288 to the gas impermeable skins of first layer 280 and second layer 282 to form an airtight seal between the end caps 288 and the drop stitch fabric 252.

During inflation of second side rail 234, fluid (e.g., gas) enters chamber 258, thereby increasing pressure within chamber 258 and forcing first layer 280 and second layer 282 apart. In the inflated stated, first layer 280 is spaced apart from second layer 282 by a distance governed by the length of drop stitch yarns 284. In the inflated state, first and second layers 280, 282 become biaxially pretensioned, and the drop stitch yarns 284 extend to their tensioned length to maintain the shape of second side rail 234. Tensioned drop stitch yarns 284 generate a stiffness in second side rail 234 that resists axial, bending, shear, and torsion loads. In accordance with various embodiments, drop stitch yarns 284 may be parallel, or almost parallel, to sliding surface 242, perpendicular, or almost perpendicular, to the sliding direction 271 extending from the head end to the toe end of evacuation slide 210, and perpendicular, or almost perpendicular, to inner and outer surfaces 266, 268. As used in the previous context only, "almost parallel" means±10° from parallel and "almost perpendicular" means±10° from perpendicular.

In accordance with various embodiments, sliding structure 240 comprises drop stitch fabric 254. Drop stitch fabric 254 is a 3D woven fabric having a first (or upper) layer 290, a second (or lower) layer 292, and drop stitch yarns 294 extending between first layer 290 and second layer 292. Each of first layer 290 and second layer 292 includes a fabric layer and a gas impermeable skin attached to the fabric layer, similar to drop stitch fabric 160 in FIG. 2C. The gas impermeable skin of first layer 290 forms, at least a portion of, sliding surface 242 of sliding structure 240. The gas impermeable skin of second layer 292 forms, at least a portion of, underside surface 244 of sliding structure 240. Drop stitch yarns 294 extend, and/or are woven, between the fabric layer of first layer 290 and the fabric layer of second layer 292 of drop stitch fabric 254. In the inflated state, the yarns of the fabric layers of first and second layers 290, 292 extend in a direction parallel to the X-axis and a direction parallel the Y-axis (on the provided XYZ axis), and the drop stitch yarns 294 extend in a direction parallel to the Z-axis.

In various embodiments, sliding structure 240 incudes end caps 298 coupled to the gas impermeable skins of first layer 290 and second layer 292. End caps 298 are comprised of a gas impermeable material. End caps 298 may be heat bonded to the gas impermeable skins of first layer 290 and second layer 292 to form an airtight seal between the end caps 298 and the drop stitch fabric 254. In various embodiments, an adhesive may bond end caps 298 to the gas impermeable skins of first layer 290 and second layer 292 to form an airtight seal between the end caps 298 and the drop stitch fabric 254.

During inflation of sliding structure 240, fluid (e.g., gas) enters chamber 260, thereby increasing pressure within chamber 260 and forcing first layer 290 and second layer 292 apart. In the inflated stated, first layer 290 is spaced apart from second layer 292 by a distance governed by the length of drop stitch yarns 294. In the inflated state, first and second layers 290, 292 become biaxially pretensioned, and the drop stitch yarns 294 extend to their tensioned length to maintain the shape of sliding structure 240. Tensioned drop stitch yarns 294 generate a stiffness in sliding structure 240 that resists axial, bending, shear, and torsion loads. In accordance with various embodiments, drop stitch yarns 294 may be perpendicular, or almost perpendicular, to sliding surface 242 and sliding direction 271. As used in the previous context only, "almost perpendicular" means±10° from perpendicular.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
    a first side rail extending from a head end of the evacuation slide to a toe end of the evacuation slide;
    a second side rail extending from the head end of the evacuation slide to the toe end of the evacuation slide; and
    a sliding structure located between the first side rail and the second side rail, the sliding structure comprising a first drop stitch fabric,
    wherein the first drop stitch fabric comprises a first layer, a second layer, and a plurality of drop stitch yarns extending between the first layer and the second layer,
    wherein the first layer forms a sliding surface of the evacuation slide,
    wherein the first layer comprises a first fabric layer and a first skin attached to the first fabric layer,
    wherein the second layer comprises a second fabric layer and a second skin attached to the second fabric layer,
    wherein the first layer and the second layer are each woven using yarn woven in two orthogonal yarn directions,
    wherein the two orthogonal yarn directions include a warp direction and a weft direction, and
    wherein the first skin and the second skin each comprises a gas impermeable material.

2. The evacuation slide of claim 1, wherein the first skin is bonded to the second skin to form an airtight seal about a perimeter of the sliding structure.

3. The evacuation slide of claim 1, further comprising an end cap bonded to the first skin and the second skin.

4. The evacuation slide of claim 1, wherein the first side rail comprises a second drop stitch fabric, and wherein the second side rail comprises a third drop stitch fabric.

5. The evacuation slide of claim 1, further comprising a head rail fluidly coupled to at least one of the first side rail and the second side rail, wherein a diameter of the head rail is greater than a diameter of the at least one of the first side rail or the second side rail.

6. The evacuation slide of claim 1, wherein the sliding structure is fluidly coupled to at least one of the first side rail or the second side rail.

7. An evacuation system, comprising:
    an evacuation slide including a sliding structure, the sliding structure comprising a first drop stitch fabric,
    wherein the first drop stitch fabric comprises a first layer, a second layer, and a plurality of drop stitch yarns extending between the first layer and the second layer,
    wherein the first layer forms a sliding surface of the evacuation slide,
    wherein the first layer comprises a first fabric layer and a first skin attached to the first fabric layer,
    wherein the second layer comprises a second fabric layer and a second skin attached to the second fabric layer,
    wherein the first layer and the second layer are each woven using yarn woven in two orthogonal yarn directions,
    wherein the two orthogonal yarn directions include a warp direction and a weft direction, and
    wherein the first skin and the second skin each comprises a gas impermeable material; and
    a compressed fluid source fluidly coupled to the sliding structure.

8. The evacuation system of claim 7, wherein the plurality of first drop stitch yarns is at least one of perpendicular or almost perpendicular to the sliding surface.

9. The evacuation system of claim 8, wherein the evacuation slide further includes a side rail extending from a head end of the evacuation slide to a toe end of the evacuation slide, and wherein the side rail comprises a second drop stitch fabric.

10. The evacuation system of claim 9, wherein the second drop stitch fabric comprises an inner layer, an outer layer, and a plurality of second drop stitch yarns extending between the inner layer and the outer layer, and wherein the plurality of second drop stitch yarns is at least one of parallel or almost parallel to the sliding surface when the evacuation slide is inflated.

11. The evacuation system of claim 10, further comprising an end cap bonded to the inner layer and the outer layer of the second drop stitch fabric.

12. The evacuation system of claim 9, wherein the first drop stitch fabric defines a first chamber and the second drop stitch fabric defines a second chamber, and wherein the first chamber is fluidly coupled to the second chamber.

13. An inflatable structure for an evacuation slide, the inflatable structure comprising:
    a first layer forming a first surface of the inflatable structure;
    a second layer forming a second surface of the inflatable structure opposite the first surface; and
    a plurality of drop stitch yarns extending between the first layer and the second layer,
    wherein the first layer includes a first fabric layer and a first skin attached to the first fabric layer, the first skin forms at least a portion of the first surface of the inflatable structure,
    wherein the second layer includes a second fabric layer and a second skin attached to the second fabric layer, the second skin forming at least a portion of the second surface,
    wherein the first layer and the second layer are each woven using yarn woven in two orthogonal yarn directions,
    wherein the two orthogonal yarn directions include a warp direction and a weft direction, and
    wherein the first skin and the second skin each comprises a gas impermeable material.

14. The inflatable structure of claim 13, wherein the first skin is bonded to the second skin.

15. The inflatable structure of claim 13, further comprising an end cap bonded to the first skin and the second skin.

16. The inflatable structure of claim 13, wherein the inflatable structure is configured to form at least one of a side rail for the evacuation slide or a sliding structure for the evacuation slide.

\* \* \* \* \*